(12) United States Patent
Pruessner et al.

(10) Patent No.: US 11,073,421 B2
(45) Date of Patent: Jul. 27, 2021

(54) METHODS AND APPARATUSES FOR MEASURING OPTICAL RADIATION

(71) Applicant: The Government of the United States, as represented by the Secretary of the Navy, Washington, DC (US)

(72) Inventors: Marcel Pruessner, Chevy Chase, MD (US); Doewon Park, Herndon, VA (US); Todd Stievater, Arlington, VA (US); Dmitry Kozak, Berwyn Heights, MD (US); William Rabinovich, Silver Springs, MD (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/537,190

(22) Filed: Aug. 9, 2019

(65) Prior Publication Data
US 2020/0049549 A1 Feb. 13, 2020

Related U.S. Application Data

(60) Provisional application No. 62/716,699, filed on Aug. 9, 2018.

(51) Int. Cl.
*G01J 1/04* (2006.01)
*G01J 1/42* (2006.01)
*G01J 5/28* (2006.01)

(52) U.S. Cl.
CPC .............. *G01J 1/0407* (2013.01); *G01J 1/42* (2013.01); *G01J 5/28* (2013.01)

(58) Field of Classification Search
CPC .... G01J 1/0407; G01J 1/42; G01J 5/28; G01J 2003/423; G01J 3/42; G01N 21/636; G01N 21/7746; G01N 21/35
See application file for complete search history.

(56) References Cited

U.S. PATENT DOCUMENTS 8,400,639 B2 * 3/2013 Vollmer ................. G01N 21/77
356/480

* cited by examiner

*Primary Examiner* — David P Porta
*Assistant Examiner* — Meenakshi S Sahu
(74) *Attorney, Agent, or Firm* — US Naval Research Laboratory; Sean M. Walsh

(57) ABSTRACT

Optical detectors and methods of forming them are provided. The detector includes: a controller, pump and probe laser generators that generate modulated pump laser and probe lasers, respectively, a microring cavity that receives the lasers, a microbridge, and a photodetector. The microring cavity includes covered and exposed portions. The microbridge is suspended above the exposed portion and interacts with an evanescent optical field. The wavelength and modulated power of the pump laser are controlled to generate the evanescent optical field that excites the microbridge to resonance. The microbridge absorbs optical radiation which changes the resonance frequency proportionately. The probe laser is modulated in proportion to a vibration amplitude of the microbridge to form a modulated probe laser which is provided to the photodetector. The controller receives data from the photodetector, determines a change in resonance frequency, and calculates the amount of absorbed radiation from the change in resonance frequency.

12 Claims, 10 Drawing Sheets

METHODS AND APPARATUSES FOR MEASURING OPTICAL RADIATION

BACKGROUND

Field of the Invention

The present application relates generally to methods and apparatuses for optical sensing, and more specifically to the detection and measurement of absorbed optical radiation using optomechanical cavities.

Description of Related Art

Optical detectors for measuring electromagnetic radiation are needed for a variety of areas including optical communications, imaging, and chemical sensing applications. Several types of detectors are currently available but each suffers from one or more limitations. Semiconductor photodetectors are widely used for wavelengths ranging from the visible range to the near and mid-infrared range. However, the range of wavelengths over which these detectors can function is inherently limited by the bandgaps of the materials used to construct them. Only recently have newer materials become available that allow photodetectors to detect wavelengths of 10 microns and beyond. But these detectors generally need to be cooled with helium or nitrogen in order to minimize Johnson noise.

Micro-electro-mechanical systems (MEMS) and nano-electro-mechanical systems (NEMS) thermoresistive bolometers are another class of detector that operate by converting light into heat. Light incident on a thin film causes the temperature of the film to increase, which can be measured using the temperature coefficient of resistance (TCR) of the film. The amount of absorbed radiation is then determined from the change in resistance. While these types of bolometers have several advantages including room temperature operation, fully maximizing their abilities requires complex and costly fabrication steps.

Another type of MEMS/NEMS detector relies on the deflection of a micro-cantilever or microbridge to measure incident radiation. In these detectors, the micro-cantilever or microbridge is a thin metal film deposited on a thin suspended dielectric layer. The coefficients of thermal expansion for the metal and dielectric films are different. As a result, when the metal heats up due to absorption of radiation, the micro-cantilever or microbridge deflects. The amount of deflection is then measured and used to determine the amount of incident light. While these detectors can be highly-sensitive, they are slow to respond because their response time is inherently tied to the time it takes for the thin-film to respond to the incident radiation, i.e., the thermal time-constant is slow. Since these detectors measure absolute deflection of the microbridge or micro-cantilever, they are also subject to noise generated by thermal-mechanical (Brownian) displacement noise of the MEMS/NEMS structures.

Thus, it would be beneficial to have an infrared detector that could overcome one or more the limitations found in existing detectors.

SUMMARY OF THE INVENTION

One or more the above limitations may be diminished by structures and methods described herein.

In one embodiment, an optical detector is provided. The detector includes: a controller, a pump laser generator constructed to generate a modulated pump laser, a probe laser generator constructed to generate a probe laser, a microring cavity constructed to receive the probe laser and the pump laser, a microbridge, and a photodetector. The microring cavity includes a covered portion and an exposed portion. The microbridge is suspended above the exposed portion of the microring cavity so as to interact with an evanescent optical field in the exposed portion of the microring. The controller is configured to control the wavelength and modulated power of the pump laser such that the pump laser generates an evanescent optical field that excites the microbridge to a mechanical resonance frequency. The microbridge is constructed to absorb radiation from light impinging on the microbridge such that a resonance frequency of the microbridge changes in proportion to an amount of absorbed radiation. The probe laser is configured to be modulated in proportion to a vibration amplitude of the microbridge to form a modulated probe laser. The photodetector is constructed to receive the modulated probe laser and generate data based thereon. The controller is constructed to receive the data from the photodetector, determine a change in resonance frequency of the microbridge, and calculate an amount of absorbed radiation from the change in resonance frequency of the microbridge.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1:
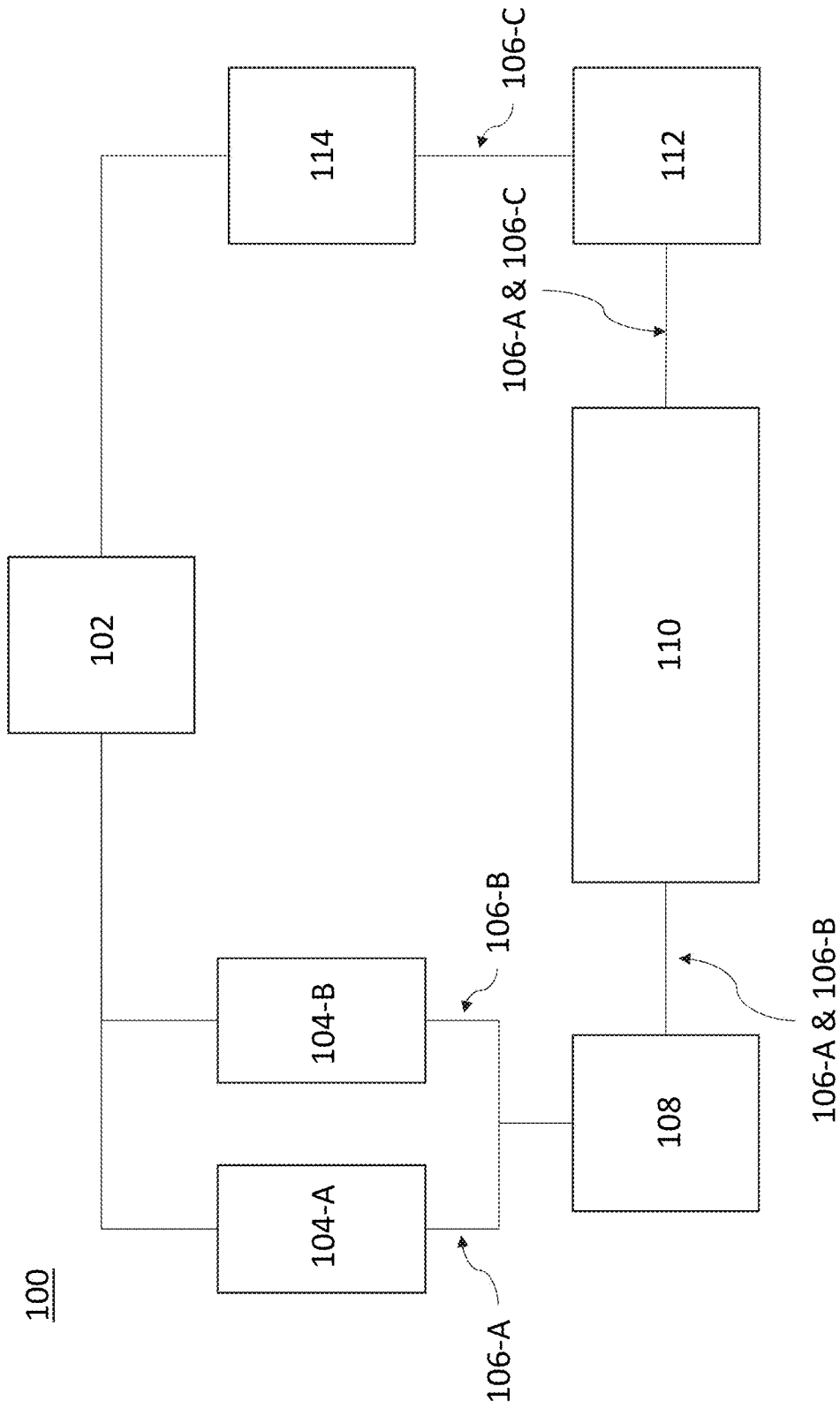
FIG. 1 is a block diagram of a system for optical sensing.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are methods and apparatuses for optical sensing.

FIG. 1 is a block diagram of a system 100 for optical sensing. A controller 102 controls the overall operation of system 100. Controller 102 includes processing circuitry (not shown) that is connected to a plurality of inputs/outputs (I/O) constructed to receive and send signals, respectively. Such processing circuitry is also connected to memory (not shown) that allows for storage of data and instructions received by controller 102, as well as a control program for controlling the overall operation of system 100. In one embodiment, controller 102 may be a network analyzer. Controller 102 is electrically connected to a pump laser generator 104-A and a probe laser generator 104-B, which are configured to receive control signals from controller 102. Such control signals may cause laser generators 104-A and 104-B to change their output power, the wavelength of emitted laser light, or both. Pump laser generator 104-A is constructed to generate and emit a modulated pump laser 106-A under the control of controller 102. More specifically, controller 102 controls pump laser generator 104-A to emit a pump laser 106-A that is repeatedly turned on and off at a certain frequency. That frequency is swept, under the control of controller 102, from low to high across a frequency range spanning the fundamental resonance frequency of a microbridge 308 (discussed below). Probe laser generator 104-B is constructed to generate and emit a continuous-wave (CW) probe laser 106-B at a constant power under the control of controller 102. In an exemplary embodiment, pump laser generator 104-A may generate a pump laser 106-A with a wavelength range between 1440-1640 nm, inclusive, and may have a maximum power output of 8 mW. Probe laser generator 104-B may generate a probe laser 106-B with a wavelength range between 1370-1490 nm, and have a maximum power of 6 mW. These wavelengths ranges and power outputs are merely exemplary, however, of one embodiment and may be different. For example, if $Si_3N_4$ and $SiO_2$ layers are used (as described below), wavelengths between 500-2,000 nm may be used (inclusive) as those materials have a transparency window in that range. Power levels may also range from 1 microwatt to 100 milliwatts for embodiments with those materials.

As described below, the modulated pump laser 106-A is used to excite a microbridge 308 to resonance via optical forces generated by the interaction of the microbridge 308 with the evanescent optical field in the microring cavity. Probe laser 106-B is used to measure a change in resonance frequency of microbridge 308. The wavelengths above could, in an alternative embodiment, be switched while the functions of each laser remains the same. However, in the preferred embodiment, these wavelengths ranges are used to avoid the possibility of adding additional heat to microbridge 308 which could cause unwanted noise. The modulated pump laser 106-A and probe laser 106-B are provided to a coupler 108 where they are coupled together. Coupler 108 may comprise two optical fibers that are fused into a three-port structure with two inputs and a single output. In one embodiment, the coupling ratio of the pump laser 106-A to the probe laser 106-B is 70/30. The output of coupler 108 is then provided to a sensor system 110, the details of which are discussed below.

Sensor system 110 includes, among other features, a MEMS microbridge 308 that is arranged in a position to receive light (e.g., infrared light) via the evanescent field of the microring cavity. Infrared light incident on microbridge 308 causes localized heating and a reduction in strain which, in turn, changes the resonance frequency of the microbridge 308 from the fundamental resonance frequency. As described in greater detail below, pump laser 106-A drives microbridge 308 to resonance. This causes microbridge 308 to vibrate and exhibit periodic displacement. When microbridge 308 oscillates at its resonance frequency it exhibits maximum displacement. The displacement of microbridge 308 tunes the cavity proportionately which, in turn, changes the amount of probe laser 106-B power that is transmitted through sensor system 110. More specifically, as the microbridge 308 moves closer to the microring 204 (within the exposed portion 204-1) the microbridge 308 interacts more strongly with the cavity's evanescent field and the effective refractive index increases. This increase in the effective refractive index causes the cavity to be tuned so that it effectively appears to be slightly longer (from the perspective of light propagating in the cavity) than before. Probe laser 106-B is no longer a continuous power laser, but rather a modulated probe laser 106-C whose transmittance power depends on the tuning of the cavity. In other words, any probe laser modulation results from the microbridge vibration, and the probe laser now contains information about the microbridge position and dynamics (e.g. time-varying displacement amplitude, phase, and frequency).

Pump laser 106-A and the modulated probe laser 106-C are output from the sensor system 110 and provided to a bandpass filter 112 which is constructed to allow the modulated probe laser 106-C to pass, but block the pump laser 106-A. The modulated probe laser 106-C is then incident on a photodetector 114 which, as one of ordinary skill will understand, generates an electrical signal corresponding to the amplitude of light incident thereon and provides the same to controller 102 for analysis. Having described the general overview of system 100, attention will now be directed to the details of the sensor system 110 in reference to FIGS. 2, 3A, and 3B.

Figure 2:
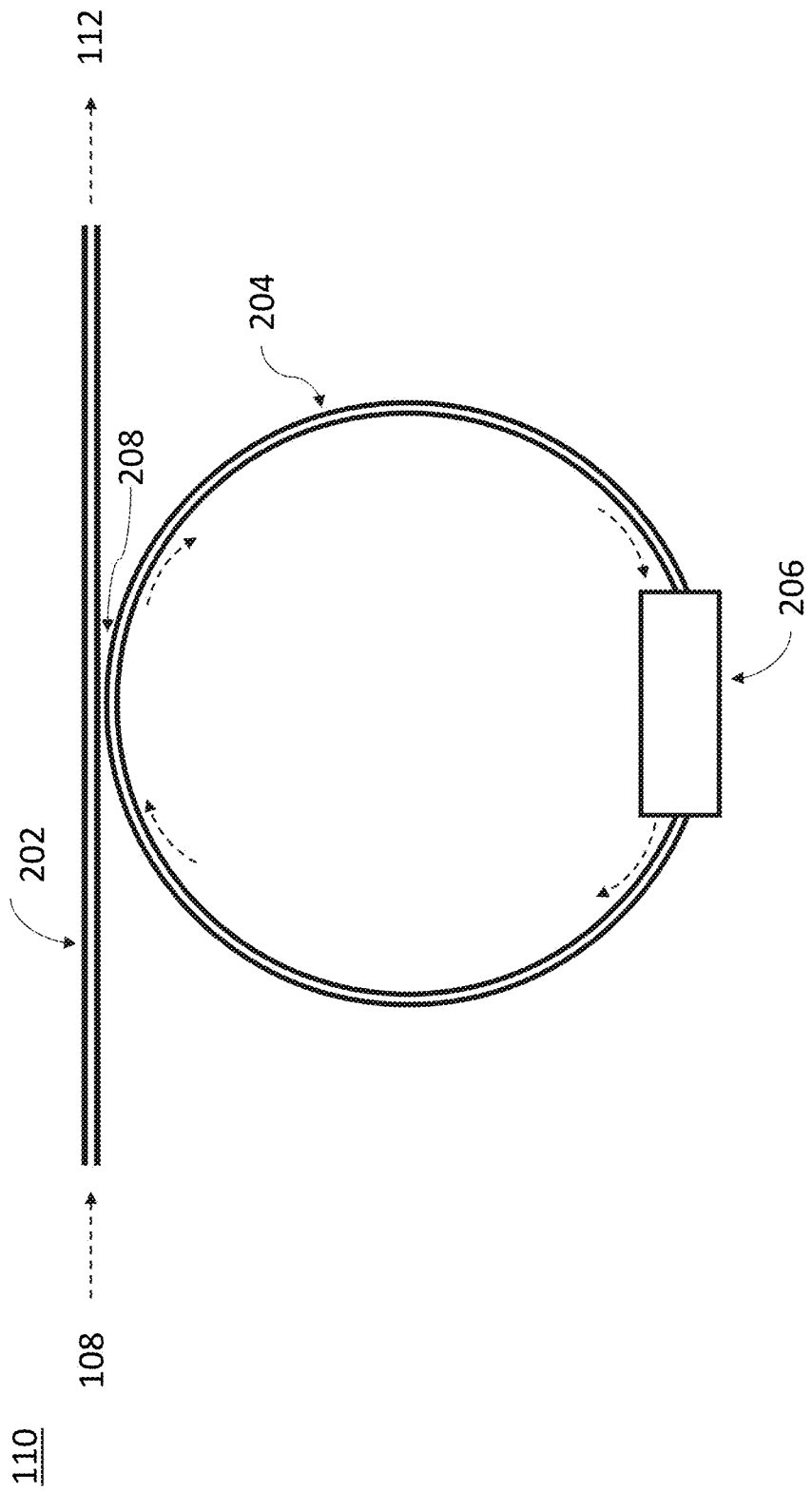
FIG. 2 is a plan view of a part of the system for optical sensing.

FIG. 2 is plan view of the sensor system 110 which includes: waveguide 202, an optical microring 204, an optomechanical coupling region 206, and a coupling gap 208 that enables light to couple from the straight waveguide 202 to the optical microring cavity 204. Waveguide 202 receives the pump laser 106-A and the probe laser 106-B from the coupler 108 and provides the same to the optical microring 204 via the coupling gap 208. Lasers 106-A and 106-B traverse the microring 204 and arrive at the optomechanical coupling region 206, which is described below. As mentioned above, probe laser 106-B is modulated in the optomechanical coupling region 206 to become modulated probe laser 106-C. Modulated probe laser 106-C and pump laser 106-A are then provided to microring 204, waveguide 202, and then to bandpass filter 112.

Turning to the details of the optomechanical coupling region 206, the fabrication of optomechanical coupling region 206, in accordance with a preferred embodiment will be described. First, material for the microring 204 is deposited on a $SiO_2$ cladding layer 302 which itself is deposited or grown on a silicon wafer. The material for microring 204, in a preferred embodiment, is stoichiometric silicon nitride ($Si_3N_4$) which has been deposited by low-pressure chemical vapor deposition (LPCVD) to a thickness of about 175 nm. In a preferred embodiment, the $SiO_2$ cladding layer 302 is approximately 5,000 nm and grown by thermal oxidation. After deposition of the material for microring 204, a patterning step is performed by electron-beam lithography followed by a 105 nm deep etch using an inductively-coupled plasma reactive ion etcher (ICP-RIE) and $SF_6/C_4F_8$ process gases. A cleaning step is then performed followed by deposition of a $SiO_2$ sacrificial layer and a $SiN_x$ device layer, with thicknesses of approximately 465 nm and 250 nm, respectively. These layers may, in one embodiment, be deposited by plasma-enhanced chemical vapor deposition (PECVD). Another patterning and partial etching step (greater than 250 nm deep but less than 715 nm) are performed, following by scribing and cleaving the chip to obtain smooth waveguide facets. The etching goes completely through a portion of the $SiN_x$ layer and partially into the deposited $SiO_2$ layer, but not all the way through as it would damage the underlying $Si_3N_4$ microring. Finally, a short time release in BOE (10:1) is performed to etch the $SiO_2$ sacrificial layer followed by a point drying step to prevent stiction (permanent collapse and adhesion of the microbridge to the ring). The result is the optomechanical coupling region 206 as illustrated in FIGS. 3A and 3B.

Figure 3A:
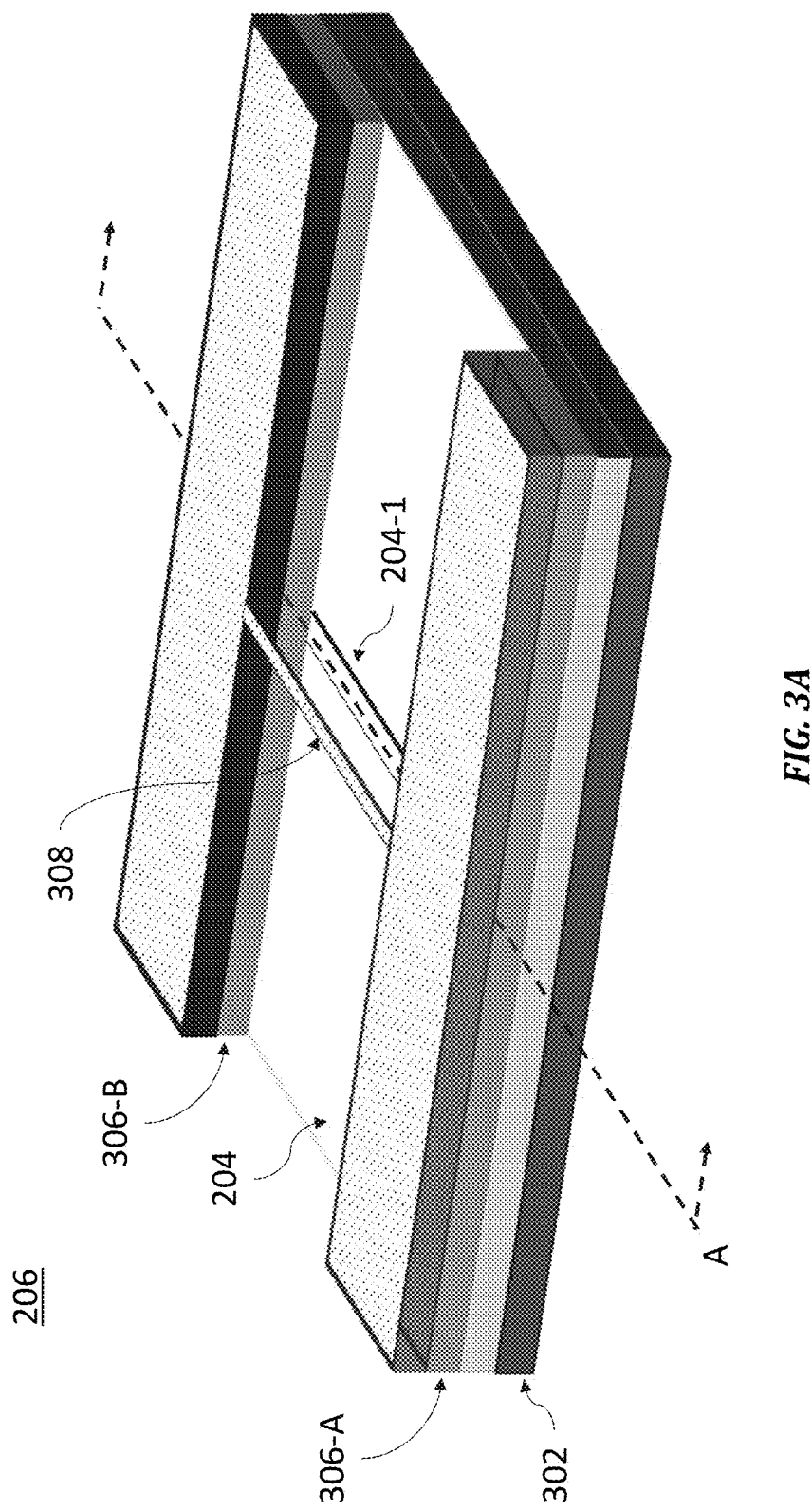
FIG. 3A is a perspective view of an optomechanical coupling region.
Figure 3B:
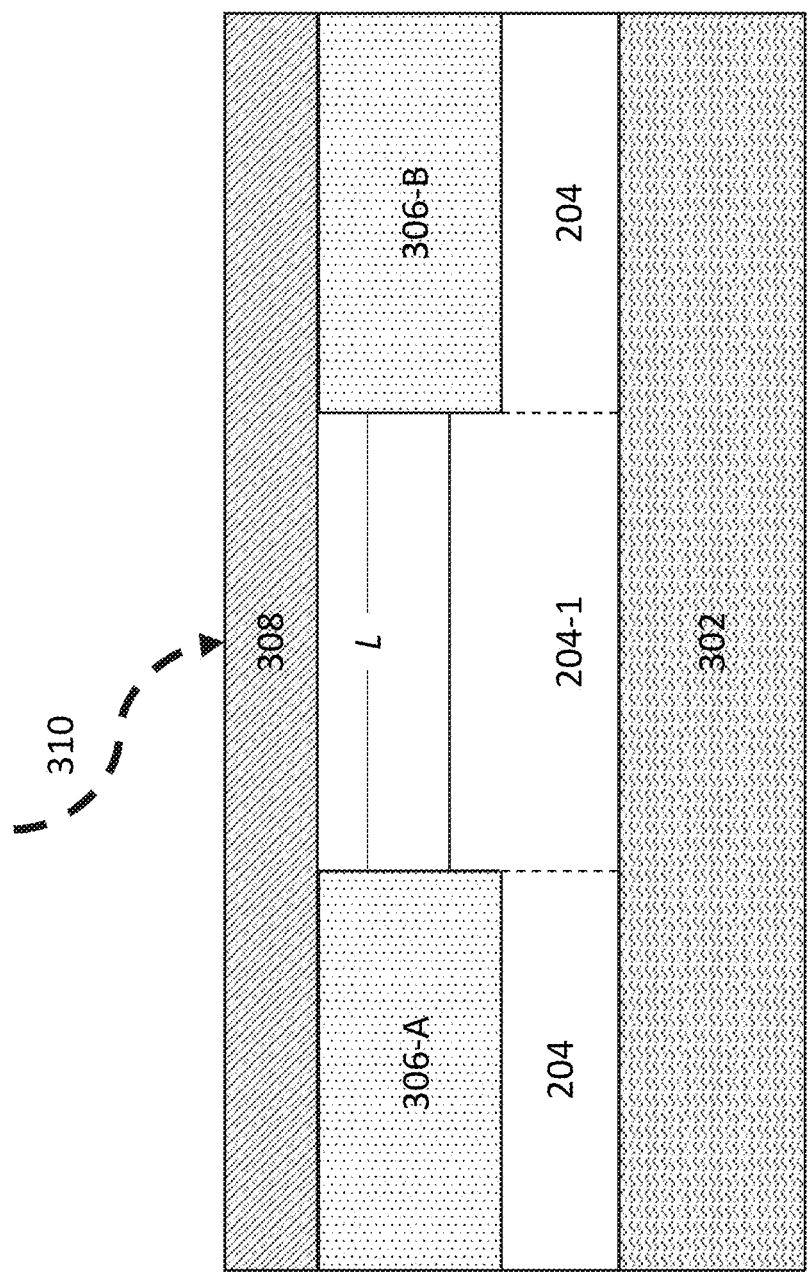
FIG. 3B is a cross-sectional view of an optomechanical coupling region taken along the axis A in FIG. 3A.

FIG. 3A is a perspective view of an optomechanical coupling region 206. FIG. 3B is a cross-sectional view of optomechanical coupling region 206 taken along the axis A in FIG. 3A. Microring 204 is disposed on the $SiO_2$ cladding layer 302, which itself is disposed on the silicon wafer (not shown). A straight portion of microring 204 lies within the optomechanical coupling region 206. Disposed on the straight portion of the microring 204 are additional $SiO_2$ cladding layers 306-A and 306-B. The purpose of cladding layers 306-A and 306-B and substrate 302 is to confine lasers 106-A and 106-B to the optical microring 204. Finally, disposed on cladding layers 306-A and 306-B is the $SiN_x$ layer, a portion of which forms the microbridge 308.

In a preferred embodiment, layer 302 is approximately 5 microns thick and the microring 204 is approximately 175 nm thick. Microbridge 308 may have a length (L) between 30-140 microns, inclusive, and, in a preferred embodiment, a thickness of approximately 250 nm and a width of approximately 3 microns. Cladding layers 306-A and 306-B may have a range of thicknesses so as to bring microbridge 308 closer to or further away from an exposed region 204-1 of microring 204. Controlling the height of the microbridge 308 above the exposed region 204-1 of the microring 204 controls the optomechanical coupling. In a preferred embodiment, the thicknesses of layers 306-A and 306-B will range between 350-470 nm. Importantly, cladding layers 306-A and 306-B do not cover an exposed region 204-1 of the microring 204 over which the microbridge 308 is suspended. In this region, air cladding is provided.

The presence of air cladding over the exposed region 204-1 creates a large evanescent optical field above the exposed region 204-1. As one of ordinary skill will appreciate, an evanescent optical field is an oscillating field emanating from the exposed region 204-1 due to the propagation of lasers 306-A and 306-B within the microring 204 As one of ordinary skill will understand, evanescent field strength decays exponentially in the exposed region 204-1. In other words, the field is a maximum just at the surface of the exposed region 204-1 and decays rapidly in the air region. As positioned, the microbridge 308 interacts with the evanescent optical field. The dielectric structure of the microbridge 308 modifies the propagating mode shape and also tunes the mode's effective index, $n_{effective}$. An optical mode is a preferred solution to light propagation in a fiber or waveguide. Each mode has a unique shape that describes the spatial distribution of optical power as light travels in the waveguide. The mode's effective index describes how fast a mode travels down a fiber or waveguide. Microbridge's 308 interaction with the evanescent optical field modifies this spatial distribution. Thus, in this context, the oscillation of microbridge 308 modifies the optical power of the probe laser 106-B since the microbridge oscillation tunes the cavity via perturbation of the mode effective index.

The position-dependence of microbridge 308 on the mode's effective index ($n_{effective}$) has two consequences. First, the $n_{effective}$ enables measurement of changes in the position of the microbridge 308. Second, it enables all-optical microbridge actuation via optical forces that are proportional to $dn_{effective}/dgap$. In other words, the pump laser 106-A can excite mechanical resonances of the MEMS microbridge 308 via optical forces, and the probe laser 106-B can be used to measure the displacement dynamics of the microbridge 308 via cavity tuning. Having described system 206, attention will now be directed to a method of using pump laser 106-A and probe laser 106-B to measure radiation incident on microbridge 308, in reference to FIGS. 4-6.

Figure 4:
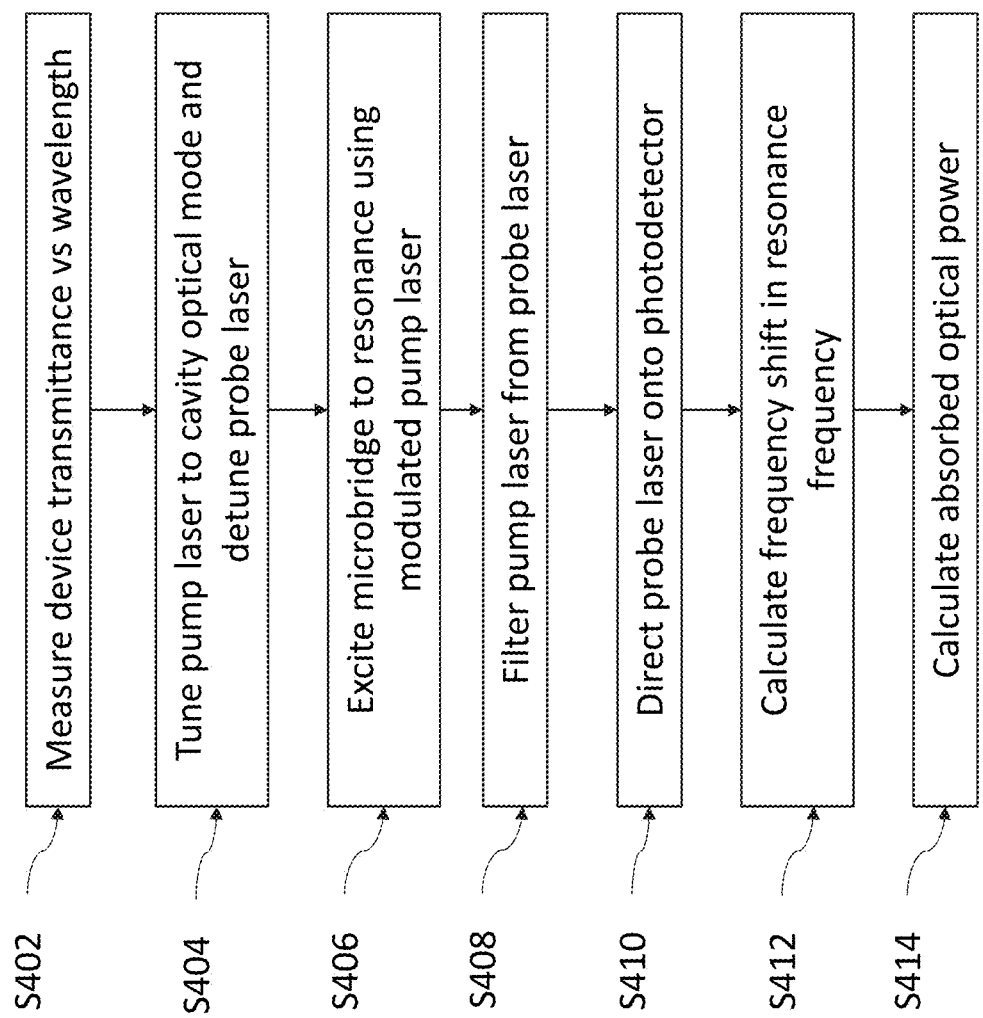
FIG. 4 is a flow chart illustrating the steps of operating the system for optical sensing according to one embodiment.
Figure 5:
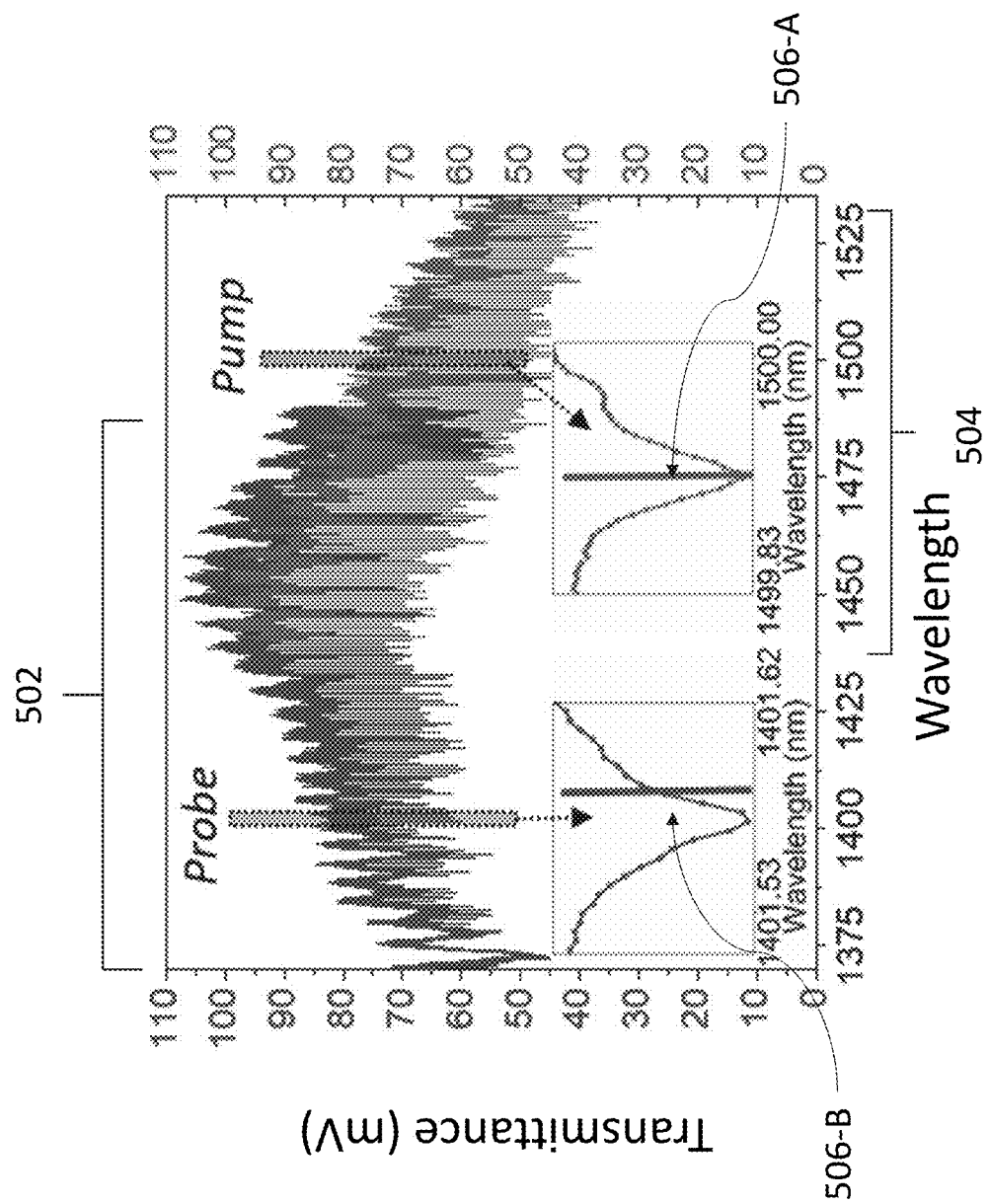
FIG. 5 is a plot of transmittance versus wavelength for the sensor system according to one embodiment.

FIG. 4 is a flowchart depicting the operation of system 100 according to one embodiment. First, in S402, probe laser 106-B is swept across different wavelengths in order to measure the device transmittance versus wavelength, as shown in FIG. 5. FIG. 5 is a plot of transmittance versus wavelength. In S402, the probe laser is swept across a first wavelength range 502, spanning 1370-1490 nm. Next, the modulated pump laser 106-A is tuned to a cavity optical mode 506-A while the CW probe laser 106-B is detuned slightly with respect to another cavity mode 506-B. A cavity optical mode is a particular solution (or wavelength) at which the cavity has an optical resonance, i.e., at this particular wavelength the microring cavity exhibits standing waves that interfere constructively resulting in a large enhancement of optical power within the cavity. In a preferred embodiment, the probe laser 106-B is detuned to a point of maximum slope proximate to another cavity mode. Thus, any small change in $n_{effective}$ (e.g., as a result of the displacement of microbridge 308) will maximize a change in cavity transmittance for probe laser 106-B thereby enabling highly-sensitive measurements of the position of the microbridge 308.

Next, in S406, the now tuned and modulated pump laser 106-A is used to excite the microbridge 308 to resonance via optical forces. One of the advantages of this arrangement is that the resonance frequency of microbridge 308 is highly sensitive to small amounts of absorbed radiation. As microbridge 308 absorbs incident radiation, photothermal strain is created in microbridge 308, which changes the resonance frequency of the microbridge 308. This process will be explained with reference to FIGS. 6A and 6B.

Figure 6A:
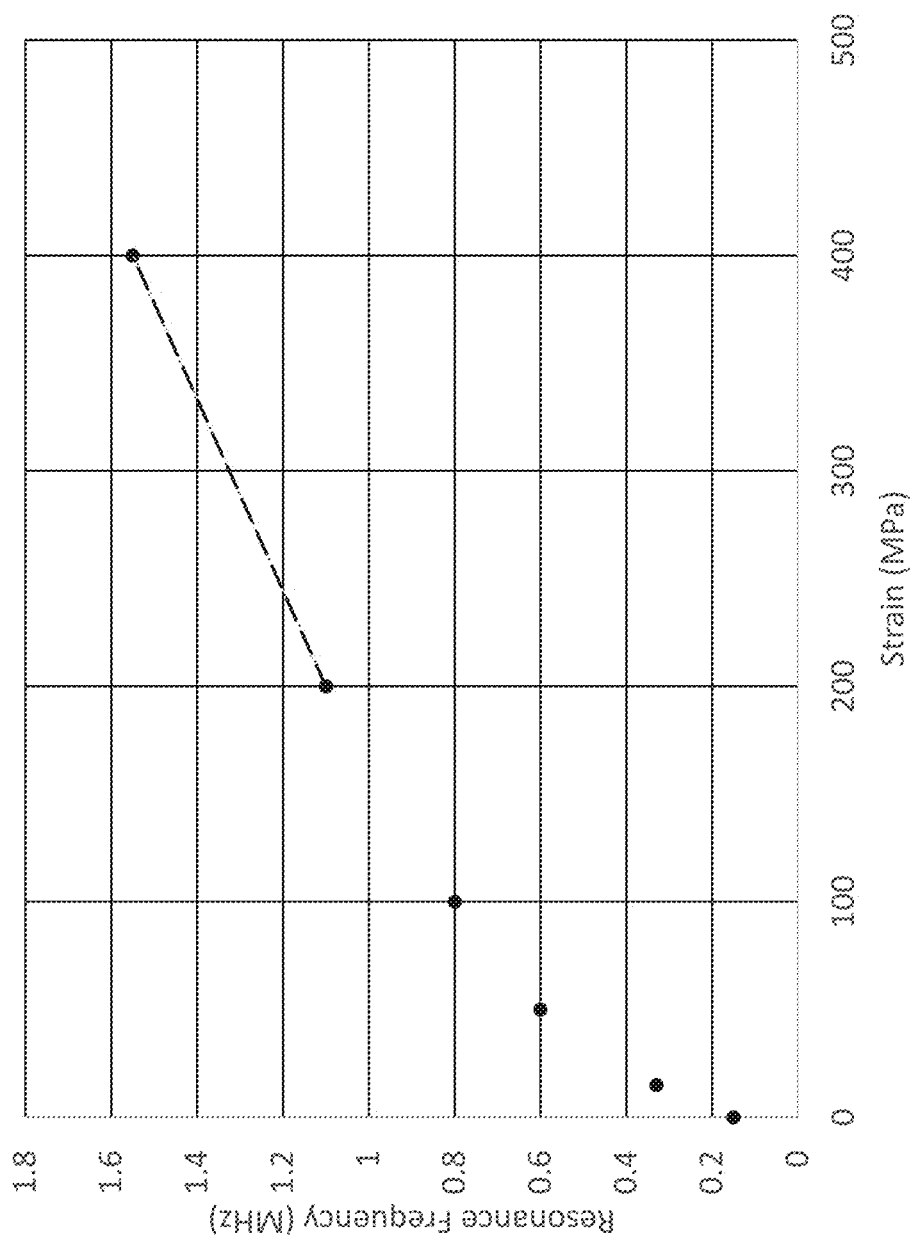
FIG. 6A is a plot of the resonance frequency for a microbridge versus strain in the microbridge.

FIG. 6A illustrates the relationship between stress and resonance frequency for a microbridge 308 that is 120 microns in length, though the linear relationship between the two (discussed below) holds for microbridges that are 30-140 microns long. Over a range of 200-400 MPa, there is a linear relationship between stress and resonance frequency, exhibiting a slope of approximately 2100 Hz/MPa. Thus, the strain sensing resolution, that is the change in strain relative to the change in resonance frequency, i.e. $\Delta\varepsilon/\Delta f$, is $1.8\times10^{-9}$ Pa/Hz. This means that sensor system 110 is capable of detecting nanostrain per Hz resonant frequency shift. Since the relationship between strain and resonance frequency is linear within the range of 200-400 MPa, the sensor's resolution can be used to calculate the absorbed power.

There are two sources of strain in microbridge 308. The first is strain as a result of the gradient optical forces. The second is strain due to photothermal absorption. The gradient optical forces which excite microbridge 308 to resonance create axial strain in the microbridge which increases the resonance frequency of the microbridge 308. As the optical power driving the gradient optical forces increases, so does the strain in microbridge 308 and the resonance frequency of microbridge 308. However, the induced strain from gradient optical forces is negligible and thus for sensing purposes any change in resonance frequency may be deemed to have occurred from photothermal absorption.

Microbridge 308 may also be subjected to induced strain from absorbed optical power. However, photothermal absorption results in compressive strain that reduces the total strain in the microbridge 308 resulting in a decrease in the resonant frequency. This is in contrast to strain as a result of gradient optical forces which causes an increase in strain. Controller 102 is constructed to calculate the absorbed power based on the change in resonance frequency of microbridge 308, using data recorded from photodetector 114. Equation 1 below shows the relationship between the change in strain of microbridge 308 and the change in temperature of microbridge 308 due to absorbed optical power.

$$\Delta\varepsilon = \Delta T\, C_{TE,308} \qquad \text{Equation 1:}$$

In Equation 1, $\Delta\varepsilon$ is the change in strain of microbridge 308, $\Delta T$ is the change in temperature of microbridge 308 due to the absorbed optical power, and $C_{TE,308}$ is the coefficient of expansion for microbridge 308. In a preferred embodiment where microbridge 308 comprises $SiN_x$, its coefficient of expansion may be used. The strain sensing resolution (given by Equation 2 below) can be used to relate the change in temperature of microbridge 308 to a change in its resonance frequency. Note that because the strain from photothermal absorption is compressive and reduces strain, the sign in Equation 2 is negative.

$$\Delta\varepsilon = -1.8\times 10^{-9}\, Pa/Hz\, \Delta f \qquad \text{Equation 2:}$$

Using Equation 2, Equation 1 can be rewritten to solve for $\Delta T$ as shown below in Equation 3.

$$\Delta T = \frac{-1.8\times 10^{-9}\, Pa/Hz\, \Delta f}{C_{TE,308}} \qquad \text{Equation 3}$$

The change in temperature of microbridge 308, however, is also given by Equation 4 below.

$$\Delta T = \frac{1}{C_p}\frac{1}{m} P_{absorbed}\, \tau_{thermal} \qquad \text{Equation 4}$$

Solving Equation 4 for $\tau_{thermal}$ using Equation 3, gives Equation 5:

$$P_{absorbed} = \frac{-1.8\times 10^{-9}\, Pa/Hz\, \Delta f\, C_p\, m}{C_{TE,308}\, \tau_{thermal}} \qquad \text{Equation 5}$$

In Equation 5, $\Delta f$ is the change in resonance frequency of microbridge 308, $C_p$ is the specific heat of the material used for microbridge 308 (0.17 J/g-K for $SiN_x$), m is the mass of microbridge 308, and $\tau_{thermal}$ is the thermal time constant which may be assumed to be equal 100 microseconds for a microbridge 308 that comprises $SiN_x$.

Figure 6B:
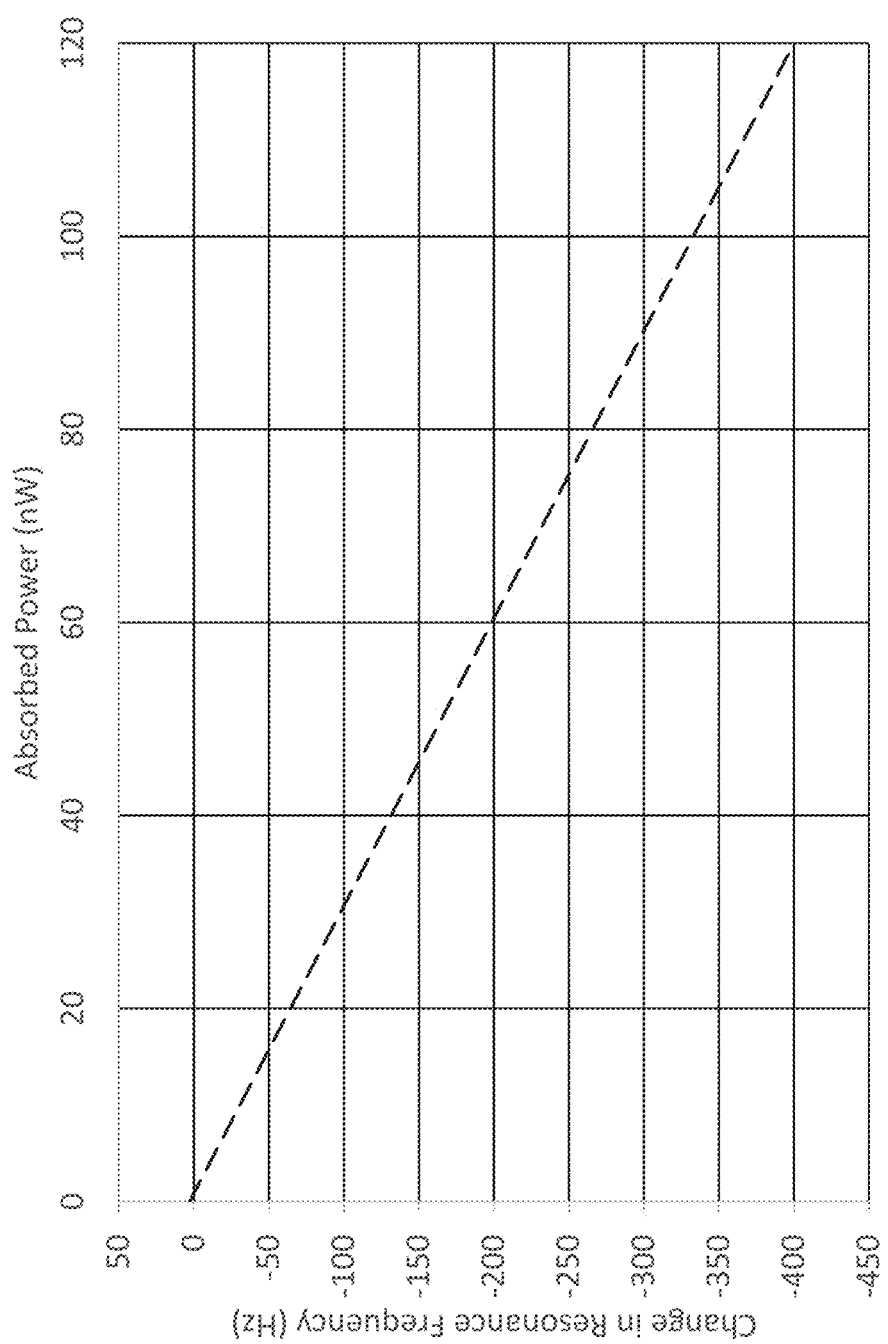
FIG. 6B is a plot of the change in resonance frequency of the microbridge versus absorbed power in the microbridge.

Using Equation 5, a plot of absorbed power (in nanowatts) versus a change in resonance frequency of microbridge 308 may be obtained, as illustrated in FIG. 6B by the dashed line. The line shown in FIG. 6B is from a model of a microbridge 308 that is 120 microns in length and has a thickness and width as described above. The model in FIG. 6B shows good agreement with measured results. It is self-evident from FIG. 6B that a relatively large change in resonance frequency corresponds to a small amount of absorbed power. For example, a 100 Hz decrease in resonance frequency corresponds to approximately 20 nanowatts of absorbed power. This means sensor system 110 is highly sensitive to nanowatt changes in absorbed power. However, the ability of sensor system 110 to detect such minute amounts of absorbed power depends on its ability to accurately measure a change in resonance frequency. That process is discussed below.

Returning to FIG. 4, the probe laser 106-B is modulated by the oscillation of the microbridge 308 that has been induced by pump laser 106-A. The result is a modulated probe laser 106-C. Both the pump laser 106-A and the modulated probe laser 106-C are provided to a bandpass filter 112, where the pump laser 106-A is filtered out from the modulated probe laser 106-C (S408). The modulated probe laser 106-C is then provided to a photodetector 114 (S410) whose amplitude data is sent to controller 102 for analysis.

Figure 7B:
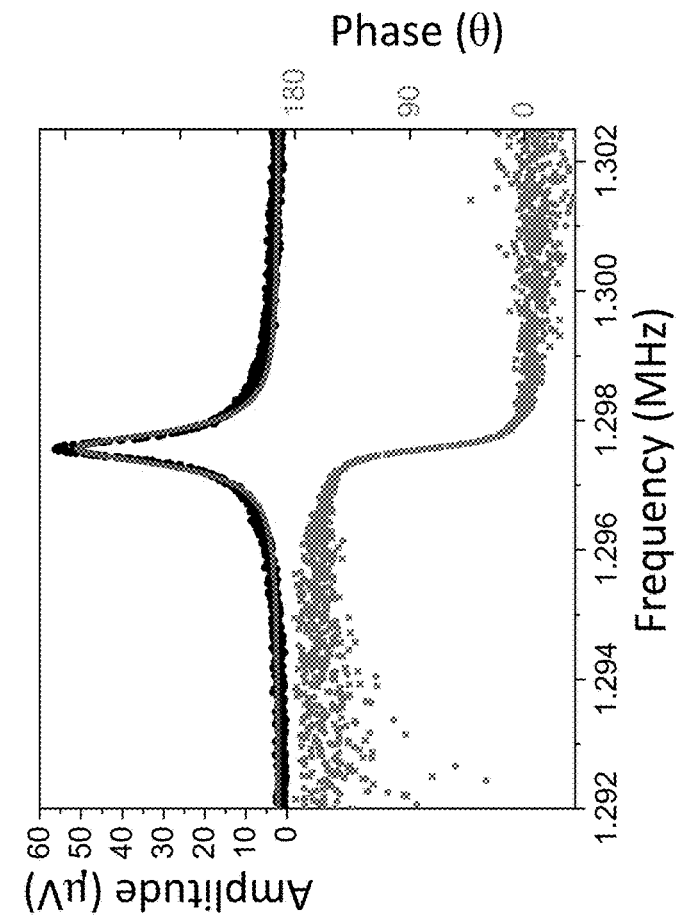
FIGS. 7A and 7B are plots of measured beam intensity and phase versus frequency recorded by a photodetector receiving a probe laser that has been modulated by the vibrating MEMS microbridge.
Figure 7A:
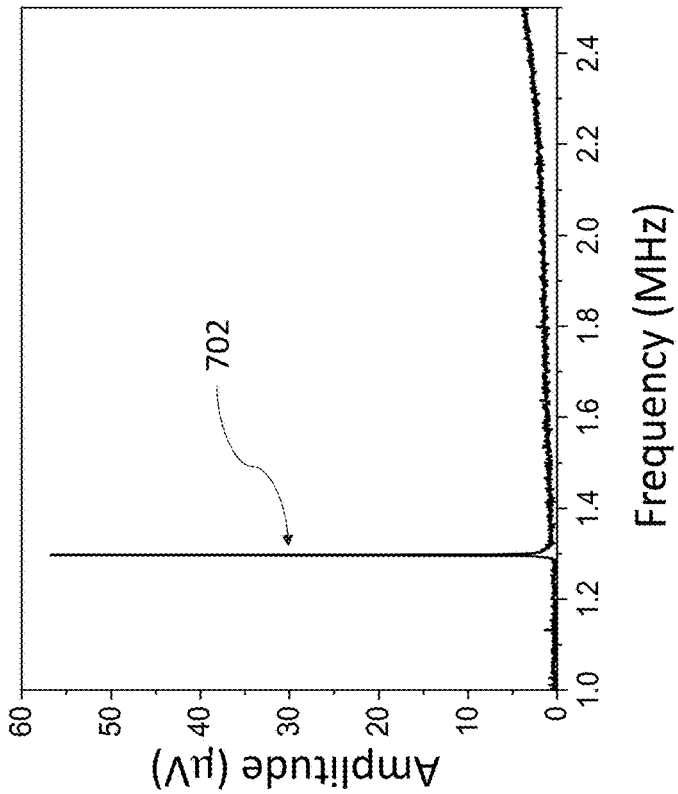

FIG. 7A shows the amplitude of the modulated probe laser 106-C versus frequency based on the data from photodetector 114. As one would expect, the amplitude is very high at the wavelength of modulated laser beam 106-C which corresponds to the resonance frequency of the microbridge 308. FIG. 7B is an expanded view of a region 702 in FIG. 7A. FIG. 7B also shows the phase of the modulated laser beam 106-C. The phase of the modulated laser beam 106-C may also be calculated by comparing the data from photodetector 114 to the radio frequency signal used to modulate the pump laser 106-A. Any resonance will exhibit a 180° phase sift as the frequency is swept across the resonance frequency. Thus, the resonance frequency of the microbridge 308 may be determined, in S412, by either the amplitude of the modulated laser beam 106-C or the relative phase. Finally, in S414, the change in resonance frequency is used to calculate the optical power absorbed using Equation 5.

Figure 8:
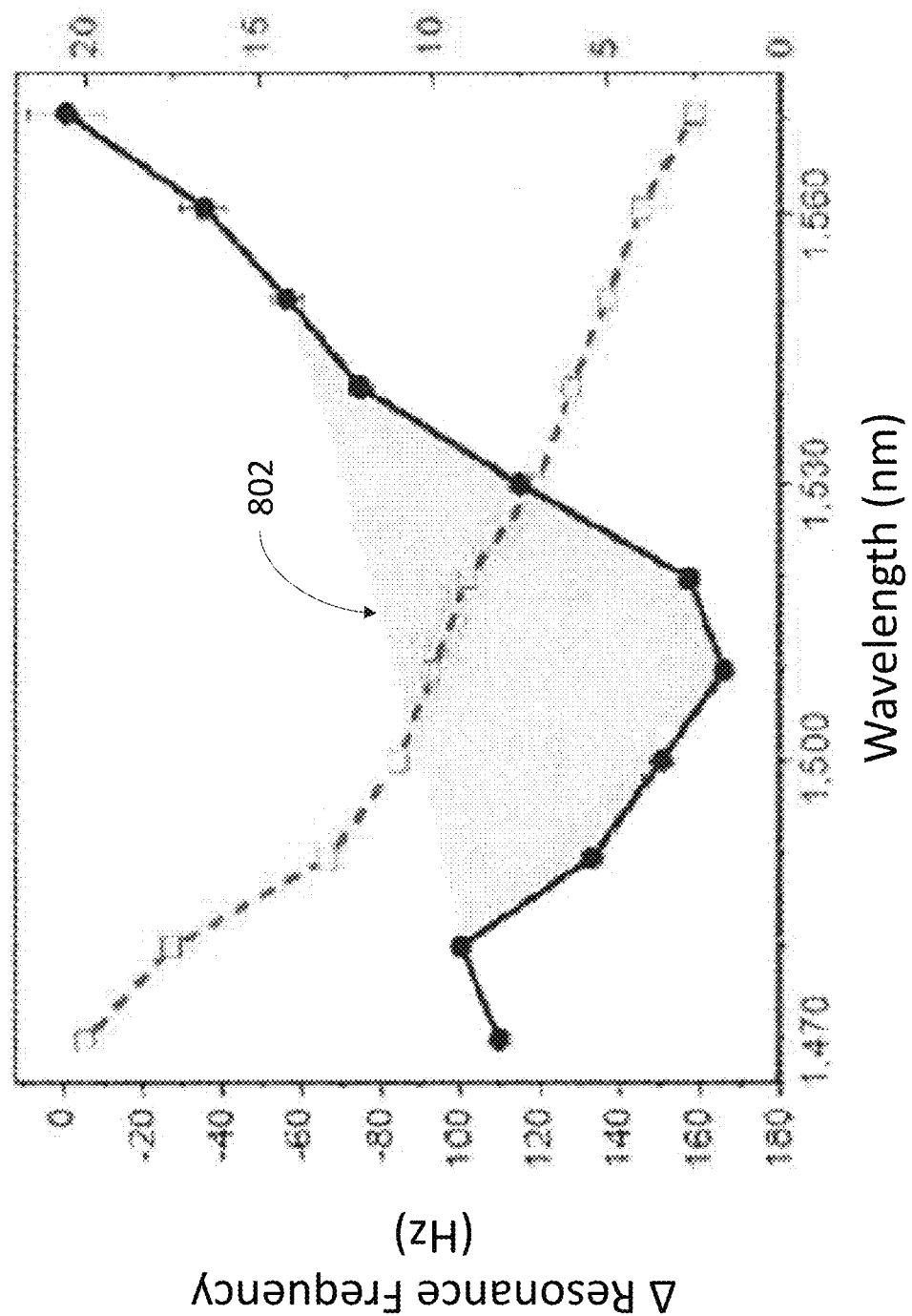
FIG. 8 is a plot of the measured change in resonance frequency of a microbridge versus wavelength according to one embodiment.

Described above are methods and apparatuses for measuring absorbed optical power. However, those methods and apparatuses may be slightly modified to perform another task: photothermal spectroscopy. In one embodiment, a chemical analyte may been absorbed onto microbridge 308. In another embodiment, the chemical analyte is part of the microbridge itself (e.g., microbridge 308 may comprise hydrogen due its incorporation in the $SiN_x$ film during film deposition). In either embodiment, a significant increase in optical absorption at certain wavelengths where light is preferentially absorbed by the analyte will cause a large shift change in resonant frequency. FIG. 8 is exemplary. FIG. 8 is a plot of change in resonance frequency versus wavelength for a microbridge 308 that includes Si—H due to the formation of microbridge 308 by film deposition. Si—H preferentially absorbs light at a wavelength of approximately 1520 nm. FIG. 8 shows a substantial change in resonance frequency shift that is centered around 1520 nm. This indicates that the microbridge 308 is preferentially absorbing radiation at this wavelength, resulting increased absorbed optical power, and thus a pronounced decrease in resonance frequency of microbridge 308 due to the increase in compressive strain. Thus, by analyzing the change in resonance frequency for regions of increased frequency shift, controller 102 may be able to identify the analyte on or within microbridge 308.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An optical detector, comprising:
  a controller;
  a pump laser generator constructed to generate a modulated pump laser;
  a probe laser generator constructed to generate a probe laser;
  a microring cavity constructed to receive the probe laser and the pump laser, wherein the microring cavity includes a covered portion and an exposed portion;
  a microbridge suspended above the exposed portion of the microring cavity so as to interact with an evanescent optical field in the exposed portion of the microring,
  wherein the controller is configured to control the wavelength and modulated power of the pump laser such that the pump laser generates the evanescent optical field that excites the microbridge to a mechanical resonance frequency,
  wherein the microbridge is constructed to absorb radiation from light impinging on the microbridge such that a resonance frequency of the microbridge changes in proportion to an amount of absorbed radiation, and
  wherein the probe laser is configured to be modulated by the microbridge in proportion to a vibration amplitude of the microbridge to form a modulated probe laser; and
  a photodetector constructed to receive the modulated probe laser and generate data based thereon,
  wherein the controller is constructed to receive the data from the photodetector, determine a change in resonance frequency of the microbridge, and calculate an amount of absorbed radiation from the change in resonance frequency of the microbridge.

2. The detector according to claim 1, wherein a wavelength of the pump laser is between 1440-1640 nm, inclusive.

3. The detector according to claim 1, wherein a maximum power of the pump laser is 8 mW.

4. The detector according to claim 1, wherein a wavelength of the probe laser is between 1370-1490 nm, inclusive.

5. The detector according to claim 1, wherein a maximum power of the probe laser is 6 mW.

6. The detector according to claim 1, further comprising:
  a waveguide constructed to receive the pump laser and the probe laser and provide the pump laser and the probe laser to the microring cavity.

7. The detector according to claim 1, wherein the microring comprises stoichiometric silicon nitride.

8. The detector according to claim 1, wherein a length of the microbridge is between 30-140 microns, inclusive.

9. The detector according to claim 1, wherein a distance between the microbridge and the exposed portion of the microring is between 350-470 nm.

10. The detector according to claim 1, wherein an air gap is between the microbridge and the exposed portion of the microring.

11. The detector according to claim 1, wherein the microbridge comprises a chemical analyte.

12. The detector according to claim 1, further comprising:
  a bandpass filter configured to receive the modulated probe laser and the pump laser and allow the modulated probe laser to pass to the photodiode while blocking the pump laser.

* * * * *